(12) United States Patent
Wasilousky et al.

(10) Patent No.: US 10,656,250 B2
(45) Date of Patent: May 19, 2020

(54) GEOSPATIAL DATA COLLECTION SYSTEM WITH A LOOK AHEAD SENSOR AND ASSOCIATED METHODS

(71) Applicant: Eagle Technology, LLC, Melbourne, FL (US)

(72) Inventors: Peter A. Wasilousky, Indialnatic, FL (US); Dean A. Heimmermann, Indialantic, FL (US); Philip Smith, Melbourne, FL (US); Charles Wilson, West Melbourne, FL (US); Kenneth Laprade, Palm Bay, FL (US); Anthony Truscott, San Diego, CA (US); Graham Nelson, San Diego, CA (US); Tim Christianson, Carlsbad, CA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 249 days.

(21) Appl. No.: 15/726,514

(22) Filed: Oct. 6, 2017

(65) Prior Publication Data

US 2019/0107605 A1    Apr. 11, 2019

(51) Int. Cl.
| | |
|---|---|
| *G01C 3/08* | (2006.01) |
| *G01S 7/481* | (2006.01) |
| *G01S 17/89* | (2020.01) |
| *G01S 7/4913* | (2020.01) |
| *G01S 17/87* | (2020.01) |
| *G01S 7/497* | (2006.01) |

(52) U.S. Cl.
CPC ............ *G01S 7/4816* (2013.01); *G01S 7/497* (2013.01); *G01S 7/4913* (2013.01); *G01S 17/87* (2013.01); *G01S 17/89* (2013.01)

(58) Field of Classification Search
CPC .......... G01S 17/87; G01S 17/89; G01S 7/497; G01S 7/4913; G01S 7/4816; G01S 7/495
USPC ....................................................... 356/4.01
See application file for complete search history.

(56) References Cited

U.S. PATENT DOCUMENTS

| | | | |
|---|---|---|---|
| 6,785,032 B1 * | 8/2004 | Le Mere ................... | G01J 1/04 359/227 |
| 9,115,990 B2 | 8/2015 | Clifton | |
| 2011/0096320 A1 | 4/2011 | Krupkin et al. | |

(Continued)

FOREIGN PATENT DOCUMENTS

EP    3182159    6/2017

OTHER PUBLICATIONS

Princeton Lightwave "Merlin 32=32 free-running LIDAR camera" https:/Iwww.princetonlightwave.com/products/geiger-mode-cameras/ retreived from internet Mar. 27, 2017; pp. 4.

(Continued)

*Primary Examiner* — Mark Hellner
(74) *Attorney, Agent, or Firm* — Allen, Dyer, Doppelt + Gilchrist, P.A.

(57) ABSTRACT

A geospatial data collection system is for an aerial vehicle and includes a data collection light detection and ranging (LiDAR) device and a protection LiDAR device. The data collection LiDAR device is configured to collect geospatial data as the aerial vehicle moves along a collection path. The protection LiDAR device is configured to sense a geospatial area ahead of the data collection LiDAR device. The data collection LiDAR device is switchable from an operating mode to a protected mode based upon the protection LiDAR device.

19 Claims, 5 Drawing Sheets

(56) References Cited

U.S. PATENT DOCUMENTS

2011/0284728 A1 11/2011 Burdge et al.
2011/0285981 A1 11/2011 Justice et al.
2017/0026556 A1 1/2017 Kotelnikov et al.

OTHER PUBLICATIONS

Geiger-Mode LIDAR—Raising the Standard to New Eights HarrisGeospatial.com Mar. 16, 2016; pp. 4.

* cited by examiner

300

GEOSPATIAL DATA COLLECTION SYSTEM WITH A LOOK AHEAD SENSOR AND ASSOCIATED METHODS

TECHNICAL FIELD

The present invention relates to the field of data collection, and more particularly, to a geospatial data collection system for an aerial vehicle and related methods.

BACKGROUND

Airborne light detection and ranging (LiDAR) devices are used to collect geospatial data. Depending on the area, the collected geospatial data may be used to survey utility infrastructure to manage vegetation encroachment on power lines, determine flood risks with accurate flood plain mapping, and monitor energy assets (e.g., oil and gas) by determining the placement of wells, roads and pads, for example.

In 2014, Geiger-mode APD (GmAPD) cameras for LiDAR devices became commercially available. A Geiger-mode APD LiDAR device allows for geospatial data collection on a larger scale that is accomplished faster than linear mode APD LiDAR devices.

GmAPD LiDAR devices are ultra-sensitive and can provide high-efficiency detection of single photons. Due to this ultra-sensitivity, anomalous behavior can occur when too many photons, or too much optical input power, is incident on the GmAPD camera.

SUMMARY

A geospatial data collection system for an aerial vehicle may include a data collection LiDAR device and a protection LiDAR device. The data collection LiDAR device may be configured to collect geospatial data as the aerial vehicle moves along a collection path, and the protection LiDAR device may be configured to sense a geospatial area ahead of the data collection LiDAR device. The data collection LiDAR device may be switchable from an operating mode to a protected mode based upon the protection LiDAR device.

The data collection LiDAR device may be susceptible to an anomalous response having an optical power above a threshold while in the operating mode, and may be protected from the anomalous response while in the protected mode.

The geospatial data collection system may further include a controller configured to determine whether the optical power sensed by the protection LiDAR device exceeds the threshold. The data collection LiDAR device may comprise a camera, such as a GmAPD camera.

The data collection LiDAR device may be operable in a circular pattern, and the protection LiDAR device may be operable in a linear pattern. The protection LiDAR device may comprise a laser operating at a first frequency, and the data collection LiDAR device may comprise a laser operating at a second frequency different from the first frequency.

Another aspect is directed to a method for operating a geospatial data collection system as described above for an aerial vehicle. The method comprises operating a data collection LiDAR device to collect geospatial data as the aerial vehicle moves along a collection path, and operating a protection LiDAR device to sense a geospatial area ahead of the data collection LiDAR device. The method may further comprise switching the data collection LiDAR device from an operating mode to a protected mode based upon the protection LiDAR device.

DETAILED DESCRIPTION

The present disclosure will now be described more fully hereinafter with reference to the accompanying drawings, in which preferred embodiments of the disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
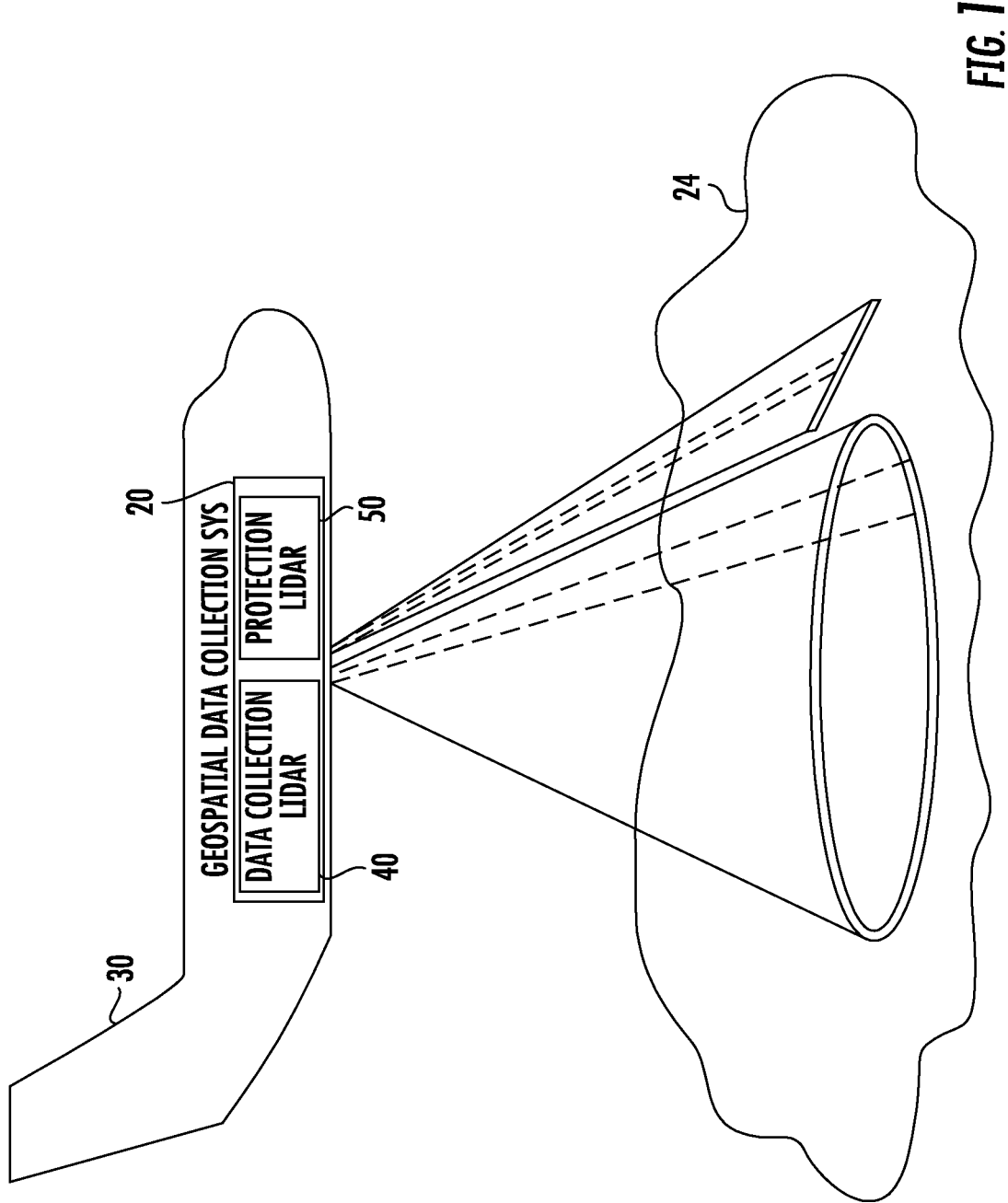
FIG. 1 is a schematic diagram of an aircraft with a geospatial data collection system with a look ahead sensor in accordance with the disclosure.
Figure 2:
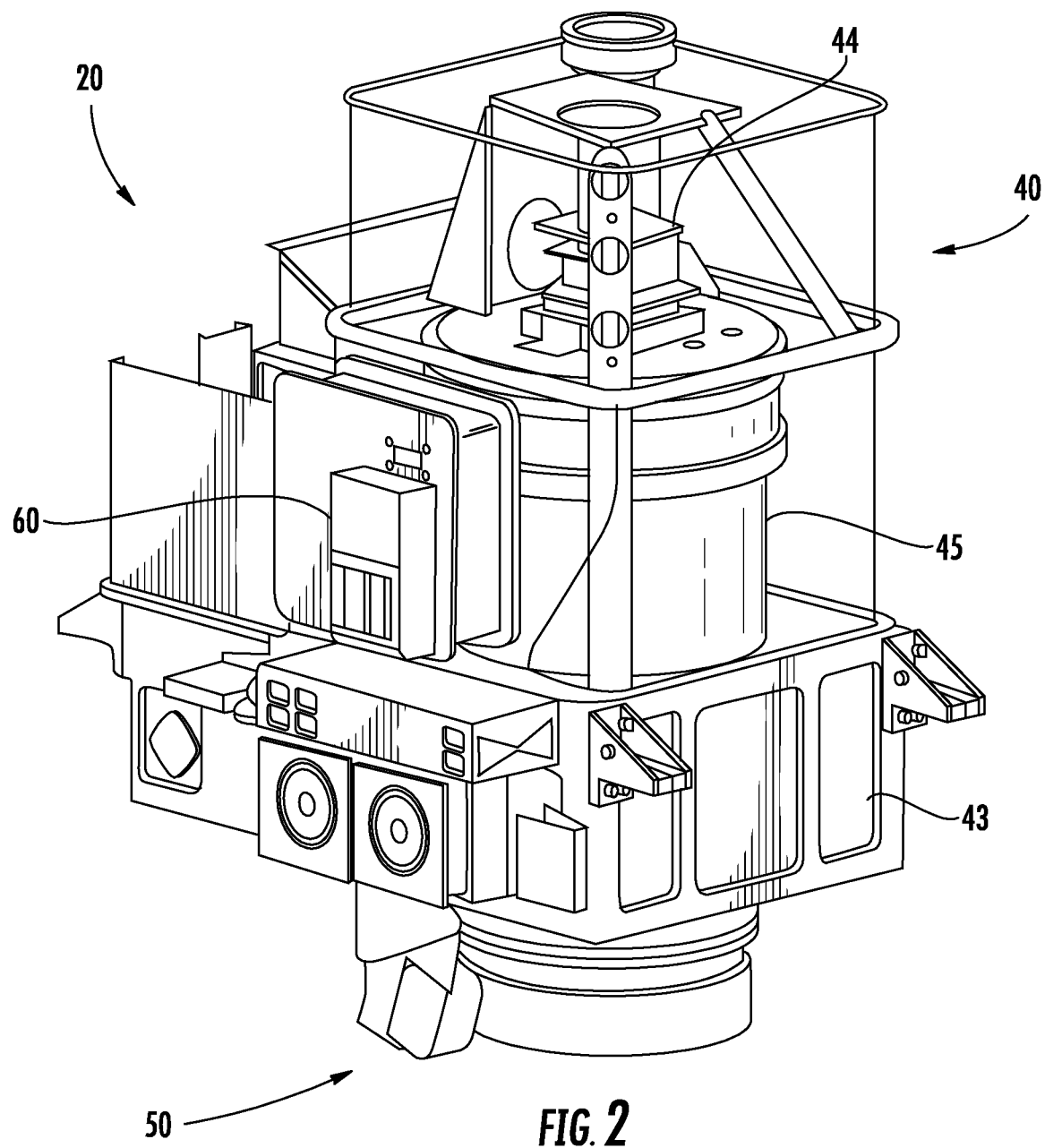
FIG. 2 is a perspective view of the geospatial data collection system with the look ahead sensor illustrated in FIG. 1.

Referring initially to FIGS. 1 and 2, a geospatial data collection system 20 for an aerial vehicle 30 includes a data collection light detection and ranging (LiDAR) device 40 and a protection LiDAR device 50. The illustrated aerial vehicle 30 is a manned airplane. The aerial vehicle 30 is not limited to an aircraft, and includes other types of airborne platforms, such as blimps or drones, for example.

The data collection LiDAR device 40 is configured to collect geospatial data as the aerial vehicle 30 moves along a collection path on the ground 24. The protection LiDAR device 50 is configured to sense a geospatial area ahead of the data collection LiDAR device 40. The data collection LiDAR device 40 is switchable from an operating mode to a protected mode based upon the protection LiDAR device 50.

The data collection LiDAR device 40 is susceptible to producing anomalous data if it receives optical power above a threshold while in the operating mode, and is protected from producing this anomalous behavior while in the protected mode. The protection LiDAR device 50 advantageously operates as a look-ahead sensor for the data collection LiDAR device 40.

The data collection LiDAR device 40 is a high resolution, high sensitivity device, whereas the protection LiDAR device 50 is a low resolution, low sensitivity device. In the illustrated geospatial data collection system 20, the data collection LiDAR device 40 is a GmAPD LiDAR device and the protection LiDAR device 50 is a Short Wave Infrared (SWIR) LiDAR device.

Due to the high sensitivity of the data collection LiDAR device 40, excessive optical power from the geospatial area under inspection can produce anomalous data from the detector elements within the GmAPD camera.

The protection LiDAR device 50 detects the presence of high optical power sources in the geospatial area ahead of the data collection LiDAR device 40. The protection LiDAR device 50 has a lower sensitivity as compared to the sensitivity of the data collection LiDAR device 40, and is not susceptible to producing anomalous data due to a large optical input.

The data collection LiDAR device 40 is packaged within a housing or strongbox 43, as illustrated in FIG. 2. A receiver telescope 45 extends within the strongbox 43 and is aligned with a camera 44 and a shutter 46 that is also within the strongbox 43. The protection LiDAR device 50 is carried by the strongbox 43. As will be discussed in more detail below, a controller 60 is also carried by the strongbox 43 for switching the data collection LiDAR device 40 from the operating mode to the protected mode based upon the protection LiDAR device 50.

Figure 3:
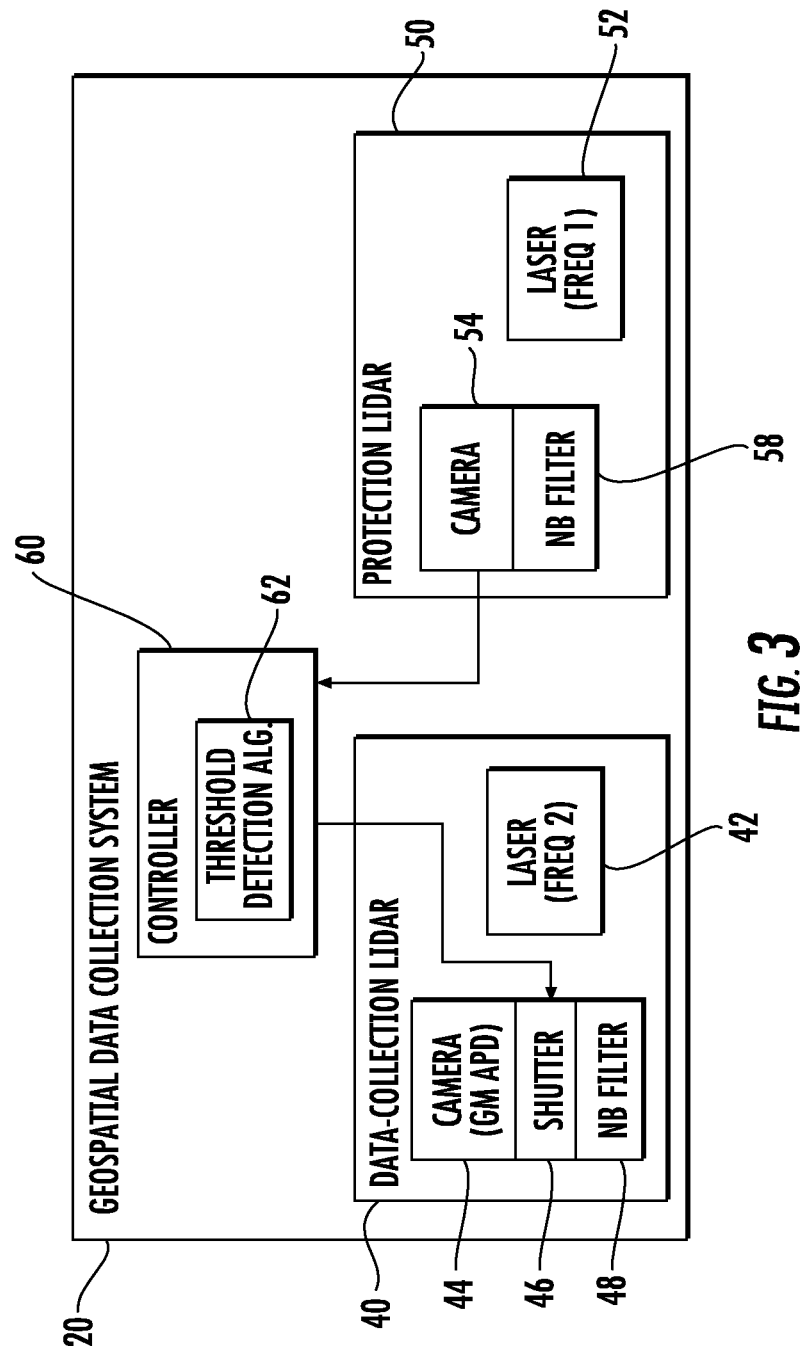
FIG. 3 is a more detailed block diagram of the geospatial data collection system illustrated in FIG. 1.
Figure 4:
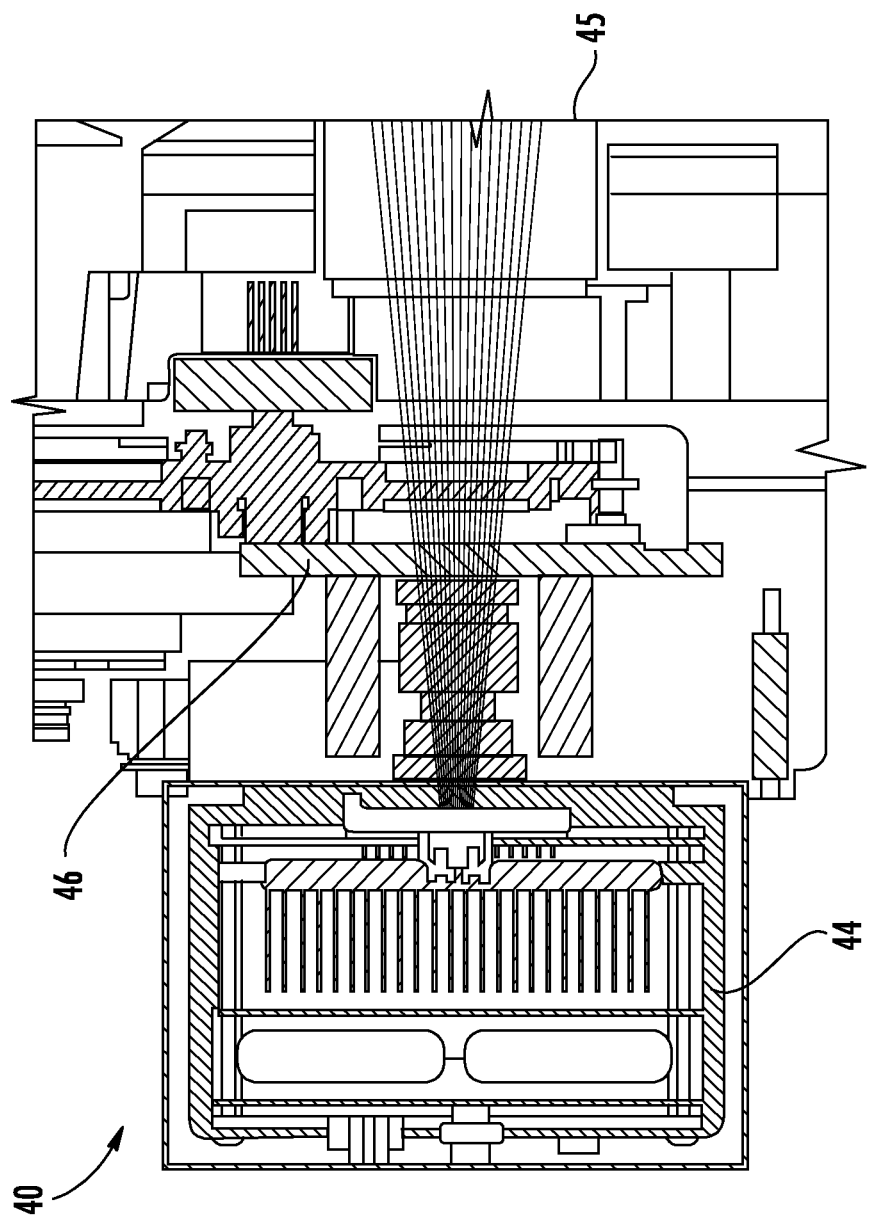
FIG. 4 is a detailed cross-sectional view of the data collection LiDAR device illustrated in FIG. 1.

Operation of the geospatial data collection system 20 will now be discussed in greater detail in reference to FIGS. 3 and 4. The protection LiDAR device 50 includes a laser 52 operating at a first frequency. The laser 52 includes a line shaper diffractive optical element so that transmission therefrom is in a linear pattern. Alternatively, the laser 52 may include a Palmer scanner instead of a line shaper diffractive optical element so that transmission therefrom is in a circular pattern.

The protection LiDAR device 50 further includes a camera 54 and a narrow band filter 58. The camera 54 may be a linear pixel array, for example. The narrow band filter 58 reduces background radiation noise as well as filtering out reflections from the laser 42 for the data collection LiDAR device 40.

The laser 42 for the data collection LiDAR device 40 operates at a second frequency. The first laser frequency of the data collection LiDAR device 40 and the second laser frequency of the protection LiDAR device 50 may be different from one another to reduce cross interference since the two devices both typically operate simultaneously.

The data collection LiDAR device 40 further includes a GmAPD camera 44, a shutter 46, and a narrow band filter 48. The camera 44 may be a two dimensional pixel array, for example. The shutter 46 is an iris-type shutter, for example. The narrow band filter 48 reduces background radiation noise as well as filtering out reflections from the laser 52 for the protection LiDAR device 40.

The geospatial data collection system 20 further includes a controller 60 configured to determine whether a given optical power sensed by the protection LiDAR device 50 exceeds the threshold. The controller 60 includes a threshold detection module 62. The threshold detection module 62 operates based on a threshold detection algorithm to determine if the optical power received by the camera 54 in the protection LiDAR device 50 exceeds the threshold. The threshold may be adjusted over time to reduce or minimize false alarm rates, as readily appreciated by those skilled in the art.

The controller 60 places the data collection LiDAR device 40 in the protection mode in response to determining that the optical power received by the protection LiDAR device 50 exceeds the threshold. This may be accomplished by closing the shutter 46 for the data collection LiDAR camera 44 for a predetermined amount of time. With the shutter 46 closed, the detector elements within the camera 44 are protected from potentially disruptive optical input powers as detected by the protection LiDAR device 50.

Operationally, the aerial vehicle 30 may be configured to fly a pre-programmed flight path, such as a raster scan, over an observation area. In a raster scan, the observation area is subdivided into a sequence of parallel strips, known as scan lines or more accurately a swath. When the aerial vehicle 30 reaches the end of a swath, it turns around and flies the next adjacent swath. This process may be repeated until the observation area has been covered by the aerial vehicle 30.

As the aerial vehicle 30 flies a swath, the protection LiDAR device 50 is looking ahead of the data collection LiDAR device 40. Timewise, the protection LiDAR device 50 may be within a range of about several seconds ahead of the data collection LiDAR device 40. This time may vary based on the operational scenario, as readily appreciated by those skilled in the art.

The reaction time by the controller 60 to place the data collection LiDAR device 40 in the protection mode by closing the shutter 46 may be in the sub-second range, for example. Depending on the operational scenario, the shutter 46 may remain closed for a variable time period. As a result, the data collection LiDAR device 40 may be in the protection mode for several seconds. This time range where the data collection LiDAR device 40 is in the protection mode is for illustration purposes and my change to better reflect specific operational scenarios, as readily appreciated by those skilled in the art.

Figure 5:
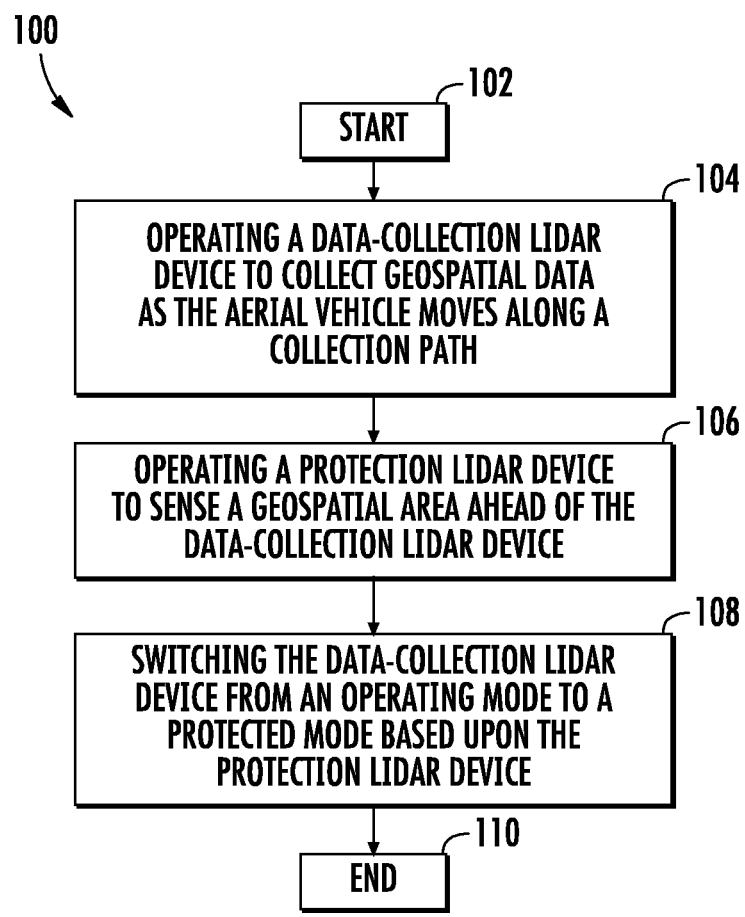
FIG. 5 is a flowchart illustrating a method for operating the geospatial data collection system with the look ahead sensor illustrated in FIG. 1.

Referring now to the flowchart 100 in FIG. 5, another aspect of the disclosure is directed to a method for operating the above described geospatial data collection system 20 for an aerial vehicle 30. From the start (Block 102), the method comprises operating a data collection LiDAR device 40 at Block 104 to collect geospatial data as the aerial vehicle 30 moves along a collection path. A protection LiDAR device 50 is operated at Block 106 to sense a geospatial area ahead of the data collection LiDAR device 40. The method further includes switching the data collection LiDAR device 40 at Block 108 from an operating mode to a protected mode based upon the protection LiDAR device. The method ends at Block 110.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial data collection system for an aerial vehicle comprising:
    a data collection light detection and ranging (LiDAR) device configured to collect geospatial data as the aerial vehicle moves along a collection path; and
    a protection LiDAR device configured to sense a geospatial area ahead of said data collection LiDAR device;
    said data collection LiDAR device being switchable from an operating mode to a protected mode based upon said protection LiDAR device.

2. The geospatial data collection system according to claim 1 wherein said data collection LiDAR device is susceptible to an anomalous response having an optical power above a threshold in the operating mode, and protected from the anomalous response in the protected mode.

3. The geospatial data collection system according to claim 2 further comprising a controller configured to determine whether the optical power sensed by said protection LiDAR device exceeds the threshold.

4. The geospatial data collection system according to claim 1 wherein said data collection LiDAR device comprises a camera and a shutter associated therewith; and wherein said shutter is open in the operating mode and closed in the protected mode.

5. The geospatial data collection system according to claim 4 wherein said camera comprises a Geiger-mode avalanche photodiode (GmAPD) camera.

6. The geospatial data collection system according to claim 1 wherein said data collection LiDAR device is operable in a circular pattern, and said protection LiDAR device is operable in a linear pattern.

7. The geospatial data collection system according to claim 1 wherein said data collection LiDAR device has a higher sensitivity than said protection LiDAR device.

8. The geospatial data collection system according to claim 1 wherein said protection LiDAR device comprises a laser operating at a first frequency, and said data collection LiDAR device comprises a laser operating at a second frequency different from the first frequency.

9. A geospatial data collection system for an aerial vehicle comprising:
a data collection light detection and ranging (LiDAR) device configured to collect geospatial data as the aerial vehicle moves along a collection path, and comprising a Geiger-mode avalanche photodiode (GmAPD) camera and a shutter associated therewith;
said data collection LiDAR device being susceptible to an anomalous response having an optical power above a threshold in the operating mode, and protected from the anomalous response in a protected mode; and
a protection LiDAR device configured to sense a geospatial area ahead of said data collection LiDAR device;
said data collection LiDAR device being switchable from the operating mode to the protected mode based upon said protection LiDAR device, and with said shutter being open in the operating mode and closed in the protected mode.

10. The geospatial data collection system according to claim 9 further comprising a controller configured to determine whether the optical power sensed by said protection LiDAR device exceeds the threshold.

11. The geospatial data collection system according to claim 9 wherein said data collection LiDAR device is operable in a circular pattern, and said protection LiDAR device is operable in a linear pattern.

12. The geospatial data collection system according to claim 9 wherein said data collection LiDAR device has a higher sensitivity than said protection LiDAR device.

13. A method for operating a geospatial data collection system for an aerial vehicle comprising:
operating a data collection light detection and ranging (LiDAR) device to collect geospatial data as the aerial vehicle moves along a collection path; and
operating a protection LiDAR device to sense a geospatial area ahead of the data collection LiDAR device;
switching the data collection LiDAR device from an operating mode to a protected mode based upon the protection LiDAR device.

14. The method according to claim 13 wherein the data collection LiDAR device is susceptible to an anomalous response having an optical power above a threshold in the operating mode, and protected from the anomalous response in the protected mode.

15. The method according to claim 14 further comprising determining whether the optical power sensed by the protection LiDAR device exceeds the threshold.

16. The method according to claim 13 wherein the data collection LiDAR device comprises a camera and a shutter associated therewith; and wherein the shutter is open in the operating mode and closed in the protected mode.

17. The method according to claim 16 wherein the camera comprises a Geiger-mode avalanche photodiode (GmAPD) camera.

18. The method according to claim 13 wherein the data collection LiDAR device is operable in a circular pattern, and the protection LiDAR device is operable in a linear pattern.

19. The method according to claim 13 wherein the data collection LiDAR device has a higher sensitivity than the protection LiDAR device.

* * * * *